United States Patent [19]

Ono

[11] Patent Number: 4,954,887

[45] Date of Patent: Sep. 4, 1990

[54] APPARATUS FOR FORMING COLOR GRAPHIC ARTS FILMS FOR AN ORIGINAL PLATE

[75] Inventor: Kenichi Ono, Kawasaki, Japan

[73] Assignee: Kabushiki Kaisha Toshiba, Kawasaki, Japan

[21] Appl. No.: 382,022

[22] Filed: Jul. 19, 1989

Related U.S. Application Data

[63] Continuation of Ser. No. 318,505, Feb. 28, 1989, abandoned, which is a continuation of Ser. No. 73,227, Jul. 14, 1987, abandoned.

[30] Foreign Application Priority Data

Jul. 22, 1986 [JP] Japan .................. 61-172256

[51] Int. Cl.$^5$ ............................................. H04N 1/387
[52] U.S. Cl. ...................... 358/75; 354/105; 358/467
[58] Field of Search .................. 358/75, 257, 280, 425, 358/434, 467; 354/105, 109; 101/395, 401.1

[56] References Cited

U.S. PATENT DOCUMENTS

| | | | |
|---|---|---|---|
| 3,775,007 | 11/1973 | Davidson | 354/105 |
| 4,255,766 | 3/1981 | Matsuda et al. | 358/257 |
| 4,320,419 | 3/1982 | Cottriall | 358/75 |
| 4,361,388 | 11/1982 | Mlcak et al. | 354/109 |
| 4,384,771 | 5/1983 | Sakurada et al. | 354/109 |
| 4,449,805 | 5/1984 | Sakurada et al. | 354/105 |
| 4,496,989 | 1/1985 | Hirosawa | 358/296 |
| 4,589,035 | 5/1986 | Yamanishi et al. | 358/296 |
| 4,631,577 | 12/1986 | Yamanishi | 358/75 |
| 4,651,222 | 3/1987 | Gokita | 358/264 |
| 4,668,978 | 5/1987 | Gokita | 358/78 |
| 4,750,212 | 6/1988 | Yokomizo | 382/56 |
| 4,816,902 | 3/1989 | Yamanishi | 358/75 |

*Primary Examiner*—James J. Groody
*Assistant Examiner*—Robert M. Bauer
*Attorney, Agent, or Firm*—Foley & Lardner, Schwartz, Jeffery, Schwaab, Mack, Blumenthal & Evans

[57] ABSTRACT

An image scanner optically scans an original to obtain color signals of different colors. A color converter converts the color signals of different colors into image formation signals of different colors. An input unit such as a ten-key pad on an operation panel or the like is used to enter control information such as a date or a control number in advance. An image forming unit performs image formation on an image forming medium by using a single-color image transfer medium in accordance with one of the image formation signals of different colors and the input control information.

10 Claims, 10 Drawing Sheets

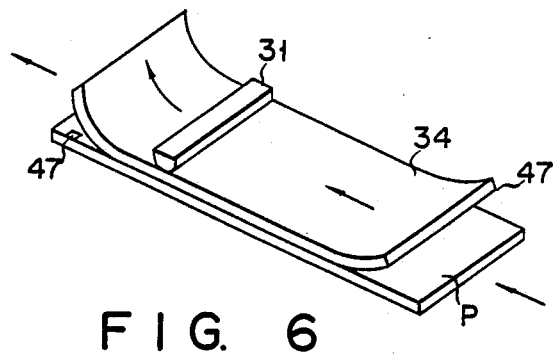
F I G. 6
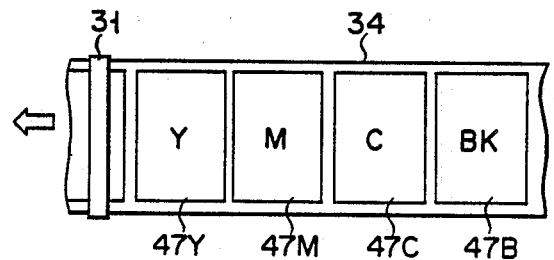
F I G. 7
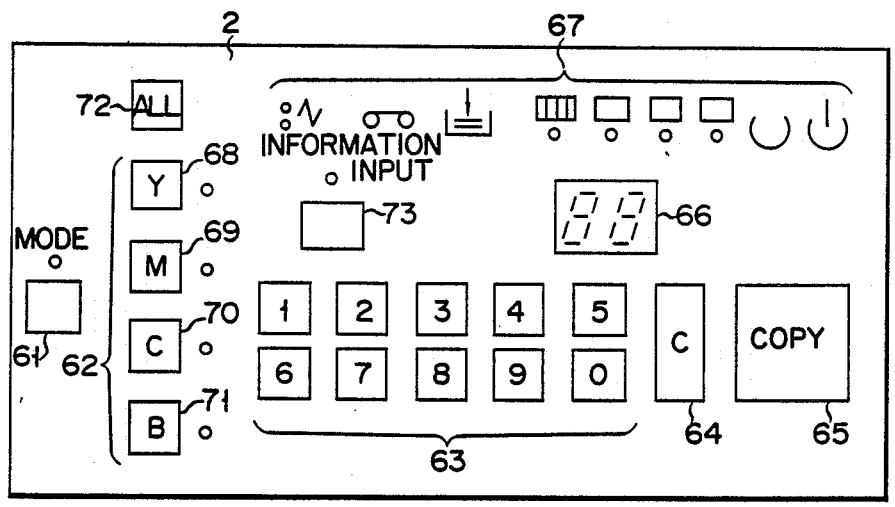
F I G. 8

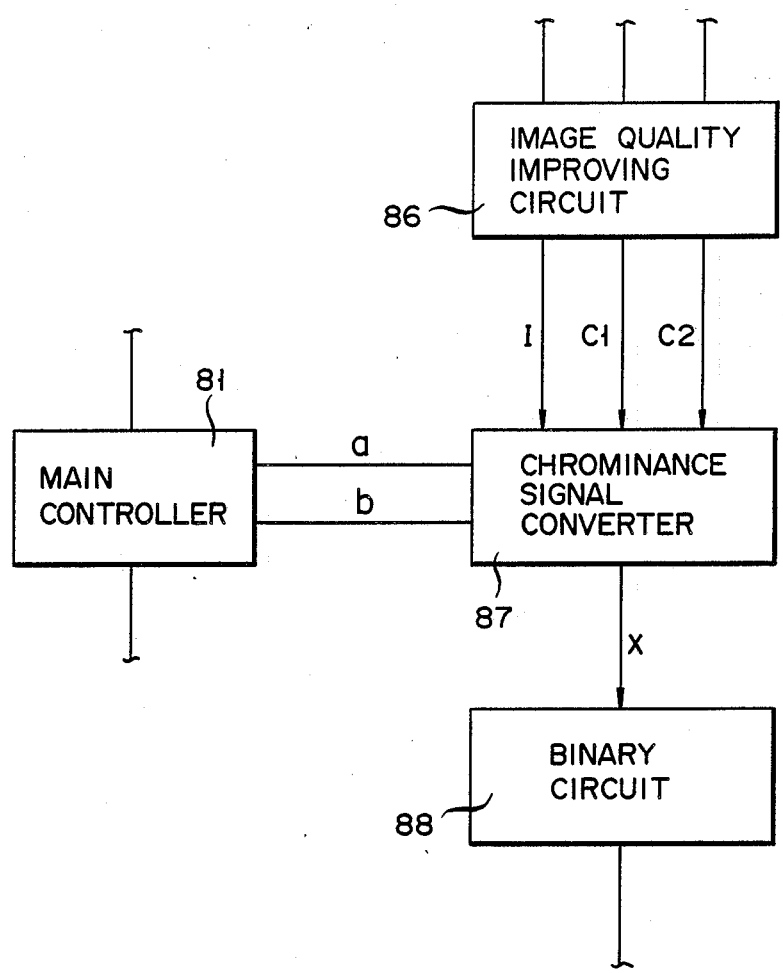
F I G. 10

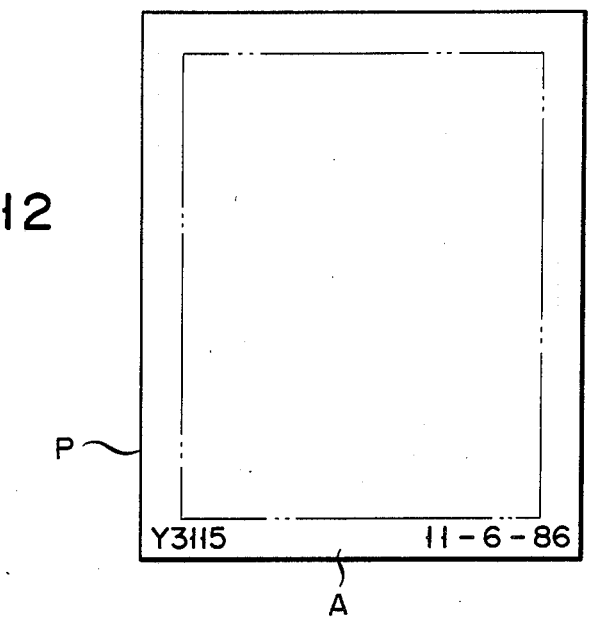
F I G. 12
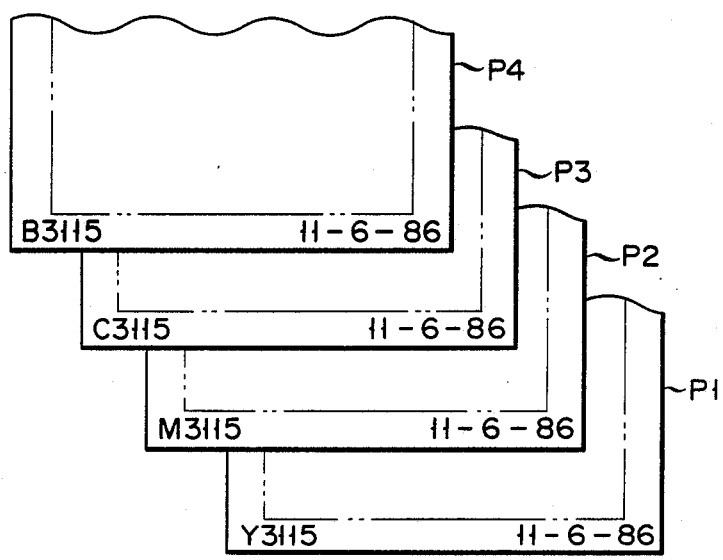
F I G. 13

APPARATUS FOR FORMING COLOR GRAPHIC ARTS FILMS FOR AN ORIGINAL PLATE

This application is a continuation of application Ser. No. 07/318,505, filed Feb. 28, 1989, which is a continuation of Ser. No. 07/073,227, filed July 14, 1987 now abandoned.

BACKGROUND OF THE INVENTION

This invention relates to an image forming apparatus with a control information input function and, more particularly, to an image forming apparatus for forming a color-separated original image required for forming an original plate in offset printing.

In recent years, graphic arts printing has developed markedly along with advances in electronics, and electronic graphic arts printing has become very popular. In electronic graphic arts printing, the density of an image of an original is photoelectrically converted into an electrical signal and the electrical signal is subjected to predetermined processing to obtain a light intensity signal. The intensity signal is used to expose a film (photosensitive medium) with light. The exposed film is developed to prepare a negative or positive film for an original plate.

According to the above technique, however, the printing process is complicated and the printing equipment is bulky, thus resulting in high costs. In a conventional system, information which is not written on the original, e.g., a data and control number, cannot be formed at a predetermined film position simultaneously with the image.

SUMMARY OF THE INVENTION

It is, therefore, an object of the present invention to provide a new and improved, compact, inexpensive image forming apparatus with a control information input function, which can easily produce a color-separated original, e.g., a graphic arts film, and allows control information input to form control information simultaneously with an image on the graphic arts film.

According to the present invention, there is provided an image forming apparatus with a control information input function, the apparatus comprising:

color image data output means for outputting color image data representing a main image to be formed on an image forming medium;

control information input means for inputting desired control information to be formed at a predetermined position on the image forming medium, the desired control information serving as control information for controlling the medium with an image; and image forming means for forming the main image on the image forming medium using one or a plurality of color agents in accordance with the color image data and the control information and for forming the control information at the predetermined position of the image forming medium.

BRIEF DESCRIPTION OF THE DRAWINGS

These and other objects and features of the present invention can be understood through the following embodiment by reference to the accompanying drawings, in which:

FIGS. 1 to 13 are views for explaining an image forming apparatus according to an embodiment of the present invention, in which FIG. 1 is a partially cutaway perspective view schematically showing the overall arrangement of the image forming apparatus, FIG. 2 is a perspective view showing the outer appearance of the image forming apparatus, FIG. 3 is a schematic side view showing an arrangement of an original scanning unit in the apparatus, FIG. 4 is a perspective view showing a scanner moving mechanism of the original scanning unit shown in FIG. 3, FIG. 5 is a longitudinal sectional view schematically showing the arrangement of an image forming unit in the apparatus, FIG. 6 is a perspective view for explaining a transfer operation state, FIG. 7 is a plan view showing an arrangement of a thermal transfer ink ribbon, FIG. 8 is a plan view of an operation panel in the apparatus, FIG. 9 is a schematic block diagram of a control system in the apparatus, FIG. 10 is a detailed block diagram for explaining a chrominance signal converter in the control system, FIGS. 11A-1, 11A-2 and 11B are flow charts for explaining the operation of the image forming apparatus, FIG. 12 is a view showing a graphic arts film formed by single-color setting, and FIG. 13 is a view showing four graphic arts films formed by a continuous (four-color) printing setting.

DETAILED DESCRIPTION OF THE PREFERRED EMBODIMENT

A preferred embodiment of the present invention will be described with reference to the accompanying drawings.

Figure 1:
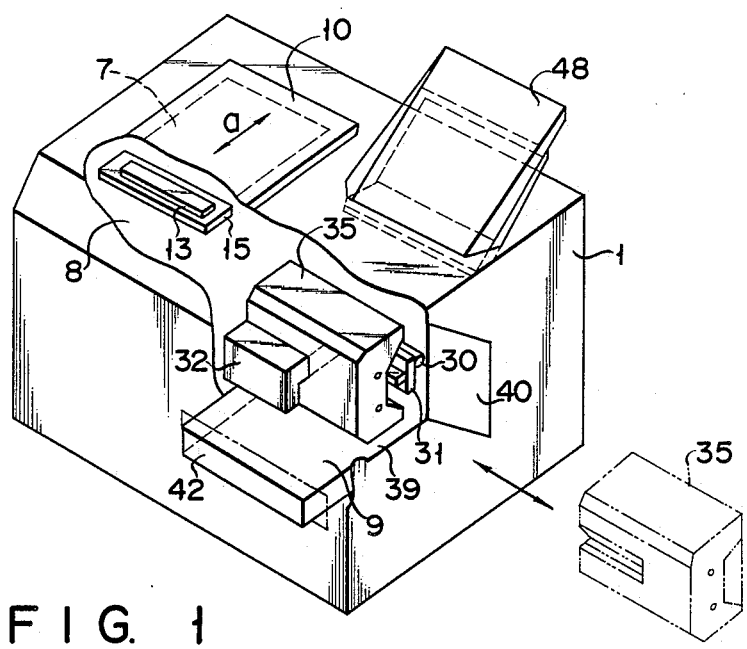
Figure 2:
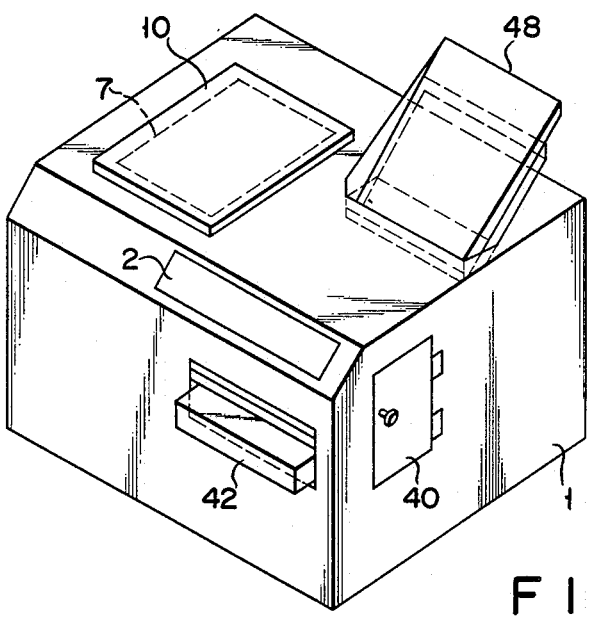

FIGS. 1 and 2 show a thermal transfer color copying machine as an image forming apparatus of the present invention, in which multicolor copies and graphic arts films (block copies) are selectively formed. Reference numeral 1 denotes a copying machine housing. Operation panel 2 is arranged on the front portion of the upper surface of housing 1. Original scanning unit 8 is arranged in the left portion of housing 1 to scan an original placed on original table 7. Image forming unit 9 is arranged in the right portion of housing 1. Reference numeral 10 denotes an original cover mounted on table 7 to be freely opened/closed.

Figure 3:
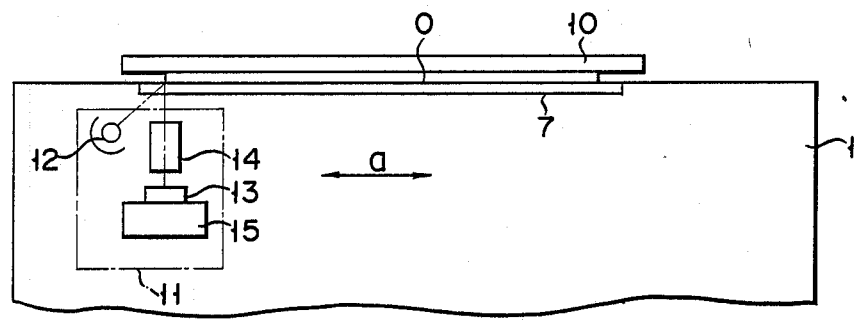
Figure 4:
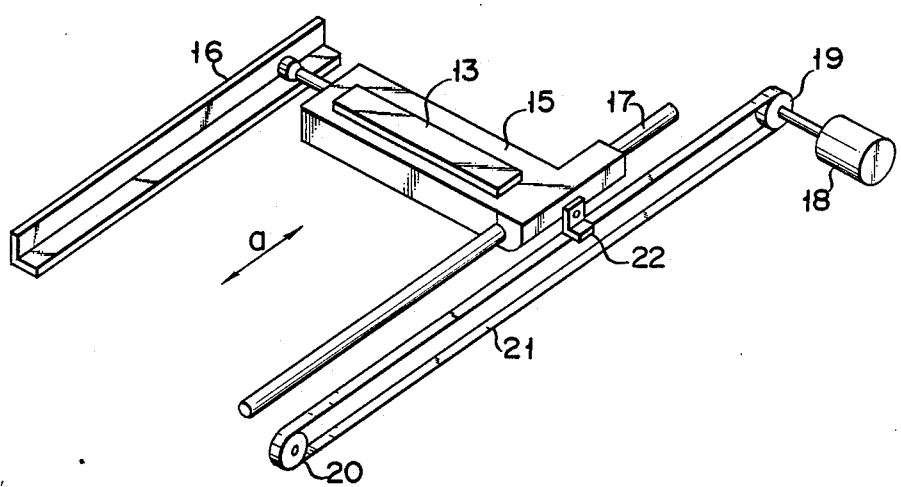

Original scanning unit 8 is arranged as shown in FIGS. 3 and 4. Original table 7 is fixed on housing 1. Scanner 11 is arranged below table 7 and reciprocated in the directions indicated by arrow a along the lower surface of table 7 to optically scan original O placed on table 7. Scanner 11 thus reads an image formed on original O. Scanner 11 comprises illumination lamp 12 for illuminating original O, photoelectric transducer 13 for receiving light reflected by original O, optical system 14 for guiding light reflected by original O to transducer 13, and carriage 15 for supporting lamp 12, transducer 13, and optical system 14. Transducer 13 photoelectrically converts light reflected by original O into electrical signals. The image of original O is separated into cyan, green, and yellow (or red, green, and blue) color signals. Transducer 13 mainly comprises a CCD line image sensor. As shown in FIG. 4, carriage 15 is reciprocally guided in directions indicated by arrow a by guide rail 16 and guide shaft 17. Driving pulley 19, driven by reversible scanning motor (e.g., a stepping motor) 18, is coupled to one end of guide shaft 17. Driven pulley 20 is coupled to the other end of shaft 17. Timing belt 21 is looped between pulleys 19 and 20. One point of belt 21 is fixed to carriage 15 through fixing member 22. When scanning motor 18 is rotated in the forward or reverse direction, carriage 15 is linearly driven.

Figure 5:
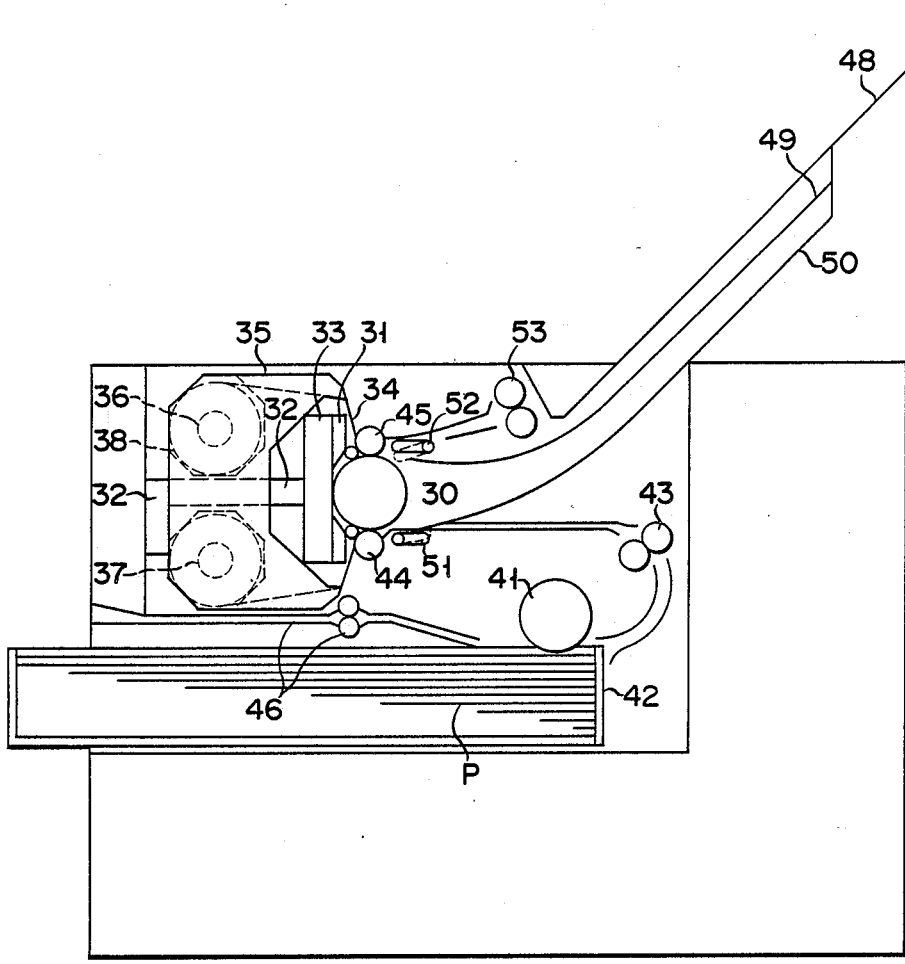

Image forming unit 9 is arranged as shown in FIG. 5. Platen 30 is arranged substantially at the center of image forming unit 9. Thermal head 31 is arranged to the left of platen 30. Head 31 is mounted on radiator 33 integral with the rear end face of holder 32. Ribbon cassette 35, which stores thermal transfer ribbon 34 as an image forming medium, is detachably loaded through holder 32. Ink ribbon 34 is interposed between head 31 and platen 30. As shown in FIG. 5, ribbon cassette 35 comprises two parallel reels 36 and 37. Ink ribbon 34 is housed in case 38 such that both ends of ink ribbon 34 are respectively wound around reels 36 and 37 and such that the intermediate portion of ink ribbon 34 is partially exposed to be interposed between platen 30 and head 31. Reels 36 and 37 can be coupled to a drive shaft of a motor (not shown) through a drive force transmission mechanism (not shown) and can be rotated as needed. As shown in FIG. 1, ribbon cassette 35 can be detachably loaded in or unloaded from holder 32 through opening 39 formed on the right side surface of housing 1. Cover 40 is arranged to cover opening 39 and can be freely opened/closed.

Paper feed roller 41 is disposed to the lower right of platen 30 and picks up sheets (or plastic films) P, as image transfer media stored in paper cassette 42, one by one. Sheet P picked up by roller 41 is fed to registration rollers 43 disposed to the upper right of roller 41. The leading end of sheet P is aligned by registration rollers 43. Sheet P is then fed toward platen 30 by rollers 43 and is wound around platen 30 by press rollers 44 and 45. Therefore, sheet P can be accurately fed. Paper cassette 42 is detachably mounted in the front surface of housing 1. Reference numeral 46 in FIG. 5 denotes a manual feed unit for allowing an operator to manually feed a single sheet.

Thermal head 31 urges sheet P against platen 30 through thermal transfer ink ribbon 34 and is designed to heat and melt ink 47 as a color agent on ink ribbon 34 so as to transfer a melted ink to sheet P, as shown in FIG. 6. In ink ribbon 34, yellow, magenta, cyan, and black ink portions 47Y, 47M, 47C, and 47B are arranged in the order named, as shown in FIGS. 6 and 7. Each of ink portions 47Y, 47M, 47C, and 47B has a length substantially equal to the width of sheet P. Head 31 transfers each ink to sheet P and returns to the home position, thereby accurately overlaying the inks one by one. Ink ribbon 34 need not have black ink portion 47B. In this case, the overlaying of yellow, magenta, and cyan inks produces a black color.

In a full-color copying mode, ink portions 47Y, 47M, 47C, and 47B of ink ribbon 34 are used to form a full-color image.

However, in order to produce a graphic arts film, a black thermal transfer ink ribbon is used as ink ribbon 34 to form an image. In this case, the black thermal transfer ink ribbon need not be used, but black ink portion 47B of ribbon 34 may be used to form an image on the graphic arts film.

In the full-color copying mode, sheet P is repeatedly reciprocated by the number of platen revolutions corresponding to the number of colors. In this case, sheet P is guided onto first and second guide plates 49 and 50 sequentially disposed along the lower surface of discharge tray 48 obliquely inclined on housing 1. Selective feeding of sheet P is performed by selector gates 51 and 52 respectively disposed between platen 30 and first guide plate 49 and between platen 30 and second guide plate 50. More specifically, sheet P picked up from paper cassette 42 is fed through registration rollers 43 and first selector gate 51. After the leading end of sheet P is wound around platen 30, platen 30 is driven in the forward direction by a pulse motor (not shown). Thus, sheet P is fed at a constant speed. At the same time, heating elements (not shown) of thermal head 31 which are aligned in line along the axial direction of platen 30 are selectively heated in accordance with a printing signal, and ink 47 of ink ribbon 34 is transferred to sheet P. The leading end of sheet P passing through platen 30 is fed to first guide plate 49 disposed along the lower surface of discharge tray 48 by second selector gate 52 located at a position indicated by the solid line. When transfer of one ink 47 to sheet P is completed, platen 30 is rotated in the reverse direction. Sheet P is then fed in the reverse direction and is returned to the transfer start position. In this case, the trailing end of sheet P is directed by first selector gate 51 toward second guide plate 50 disposed along the lower surface of first guide plate 49. In this manner, sheet P is repeatedly reciprocated to transfer inks of different colors thereto. When all inks 47 have been transferred to sheet P, sheet P is guided to discharge rollers 53 by second selector gate 52 pivoted to a position indicated by the alternate long and two short dashed line. Sheet P is finally discharged on discharge tray 48 by discharge rollers 53.

In order to form an image using a black thermal transfer ink ribbon, i.e., in order to form a graphic arts film, the number of transfer cycles is one, and no reciprocation of sheet P is performed. After one transfer cycle, sheet P is discharged onto discharge tray 48. In this case, sheet P is, for example, a plastic film.

FIG. 8 shows operation panel 2. Panel 2 includes mode key (mode selection switch) 61 for selecting one of the normal mode (color copying mode) and single-color mode (graphic arts film formation mode), color selection keys (color selection switches) 62 for designating colors in the single-color mode, ten-key pad 63 for entering the number of sheets to be copied, clear key 64 for clearing the number of sheets to be copied, copying key 65 for initiating copying, numerical display 66 for displaying the number of copied sheets, state display 67 for displaying an operating state, continuous printing key 72 for designating continuous printing (i.e., graphic arts films of the respective colors are continuously formed), and information input key 73 used for inputting control information which is not written in the original. Color selection keys 62 comprise Y key 68 for designating yellow (Y), M key 69 for designating magenta (M), C key 70 for designating cyan (C), and B key 71 for designating black (B).

Control information input procedures using information input key 73, ten-key pad 63, and Y, M, C, and B keys 68 to 71 will be described below. Assume that the date "11-6-86" is to be inputted. The operator depresses information input key 73 and then the "1" key in ten-key pad 63 twice, i.e., "1" and "1". A hyphen "-" can be input by depressing clear key 64. The operator then depresses the "6" key to enter number "6" and then clear key 64 again. The operator sequentially depresses the "8" and "6" keys in ten-key pad 63 and finally information input key 73 again. For example, control numbers such as "Y3115", "M3115", "C3115", and "B3115" may be input as described above. If wrong information is input, it can be cleared by depressing clear key 64 twice.

Figure 9:
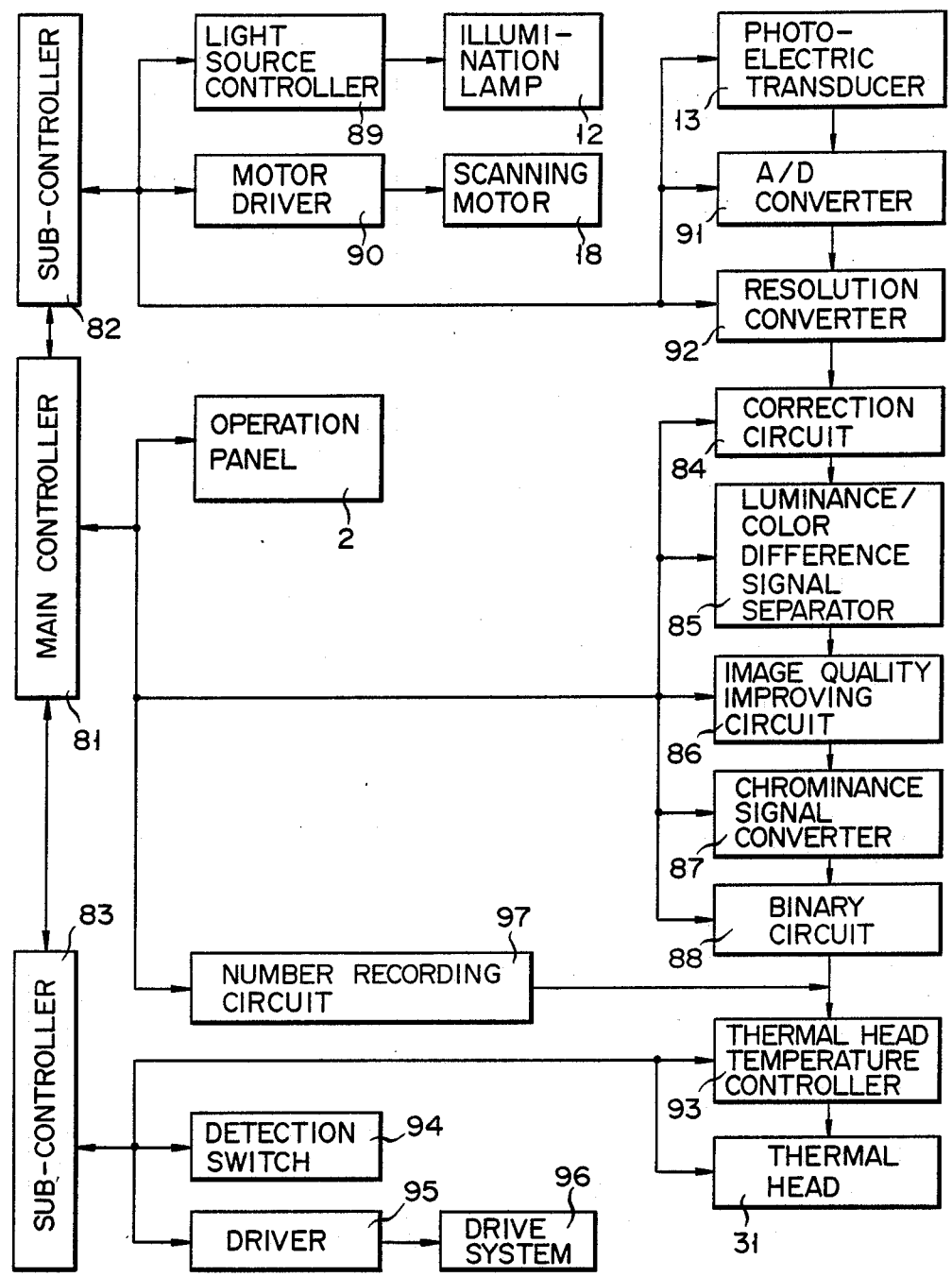
Figures 1, 11A:
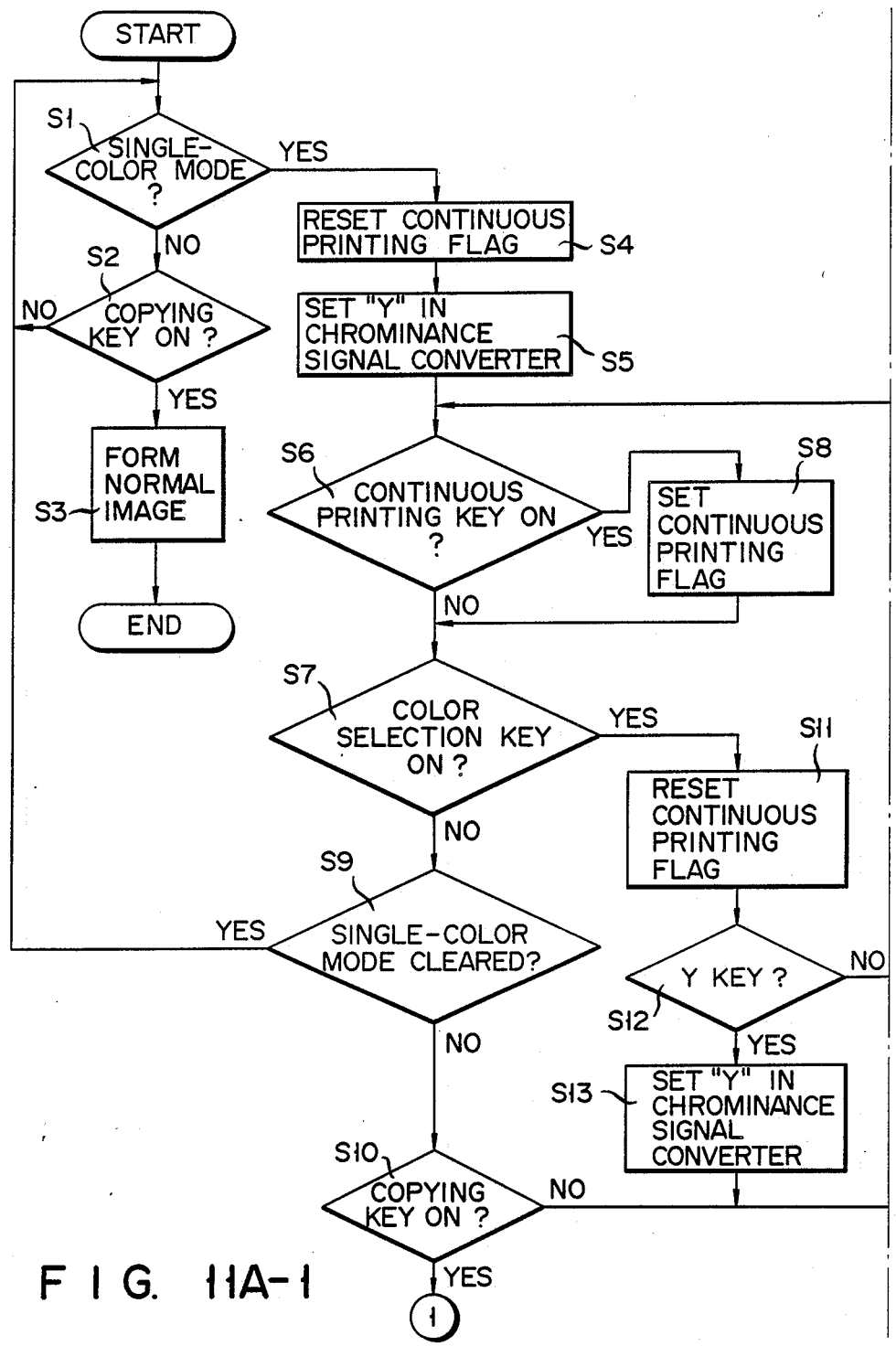
Figures 2, 11A:
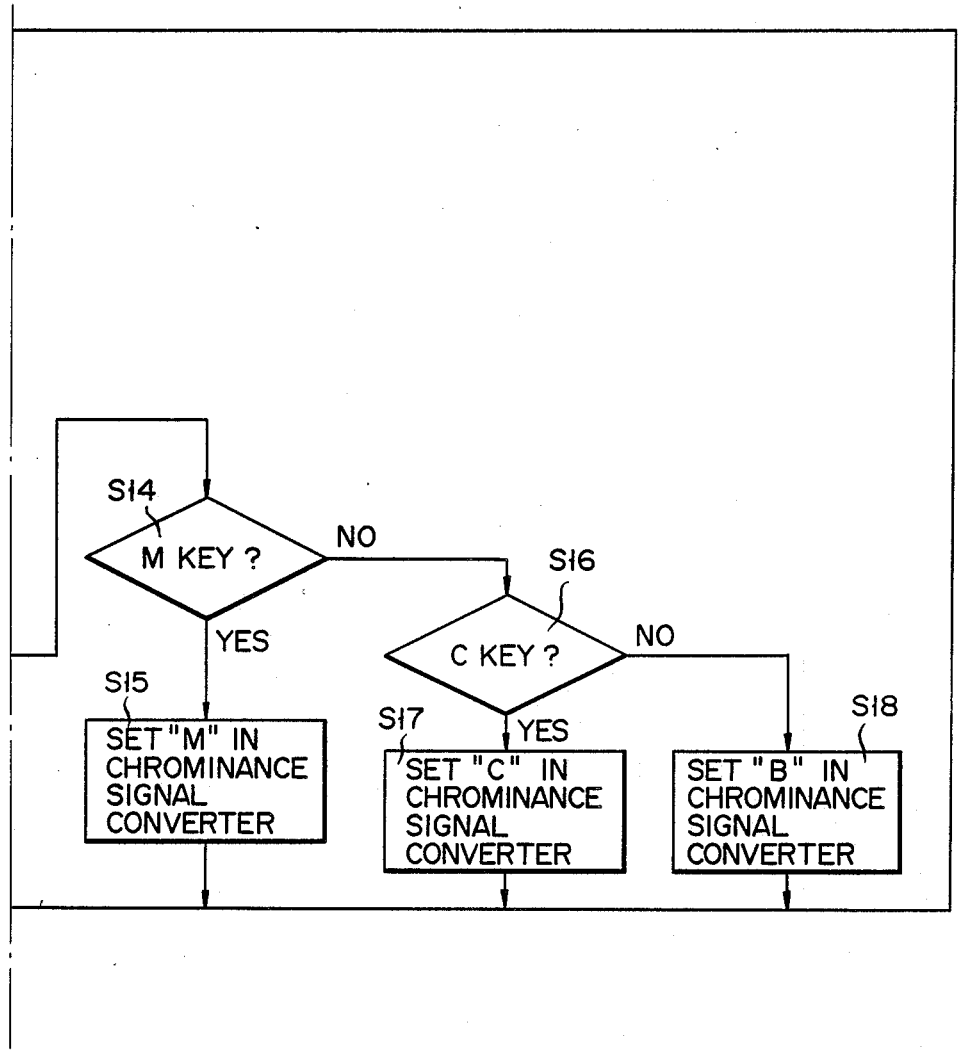
Figure 11B:
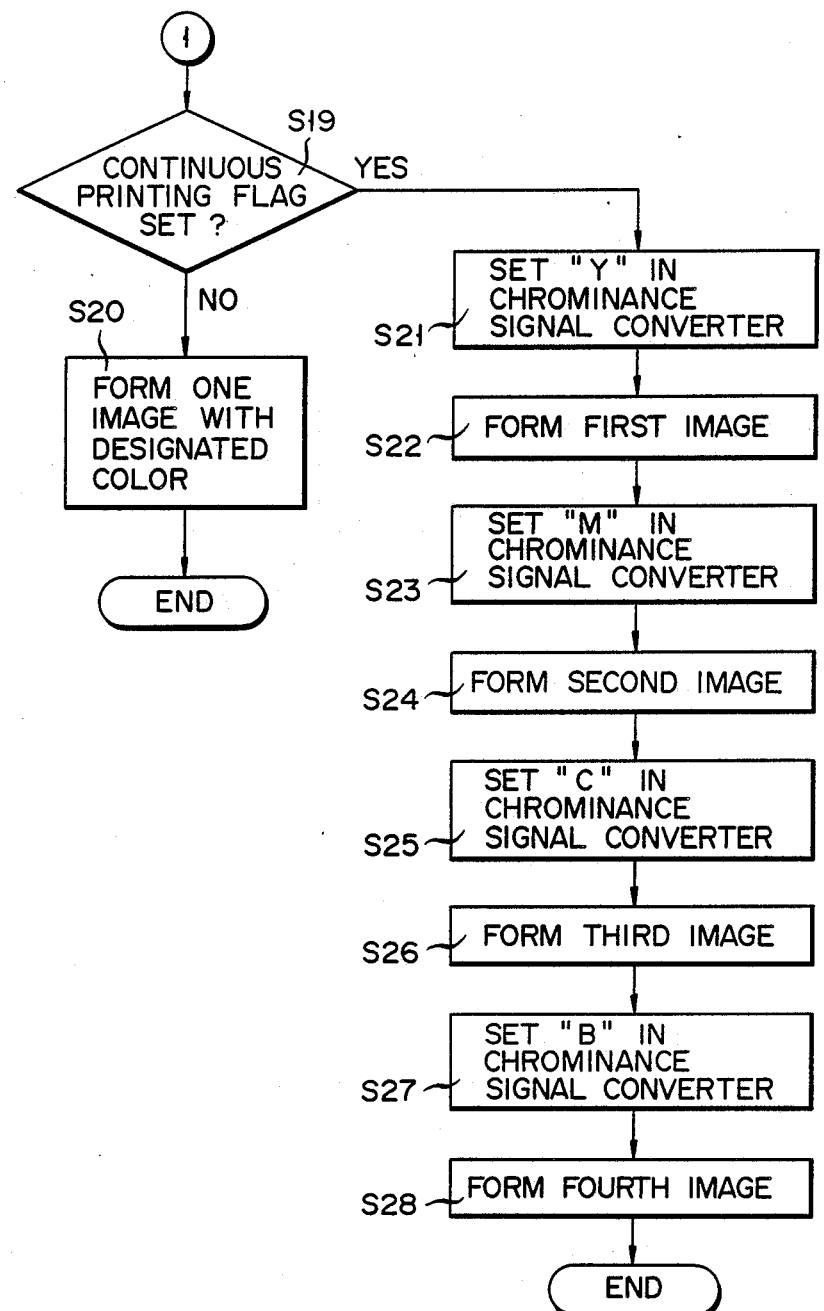

FIG. 9 schematically shows the overall control system. The system comprises main controller 81 and first and second sub-controllers 82 and 83. Controller 81 is connected to operation panel 2, correction circuit 84, luminance/color difference signal separator 85, image quality improving circuit 86, chrominance signal converter 87, binary circuit 88, number recording circuit 97, and first and second sub-controllers 82 and 83 and controls them. First sub-controller 82 is connected to light source controller 89, motor driver 90, photoelectric transducer 13, A/D converter 91, and resolution converter 92 and controls them. Light source controller 89 is connected to lamp 12 to control the amount of light emitted thereby. Motor driver 90 is connected to scanning motor 18 and drives it. Second sub-controller 83 is connected to thermal head temperature controller 93, thermal head 31, various detection switches 94, and driver 95 and controls them. Driver 95 is connected to drive system 96, such as a motor, and a solenoid and drives it.

The signal flow in the arrangement shown in FIG. 9 will be described below. Light emitted from lamp 12 and reflected by the original is focused on photoelectric transducer 13. Transducer 13 separates the reflected light into cyan (C), green (G), and yellow (Y) analog color signals. These analog signals are supplied to A/D converter 91. A/D converter 91 converts these analog color signals into digital color signals. The digital signals are supplied to resolution converter 92. Converter 92 performs resolution conversion for matching the resolution of transducer 13 with that of thermal head 31. A conversion result from converter 92 is supplied to correction circuit 84. Correction circuit 84 performs correction processing of C, G, and Y color signals sent from resolution converter 92 so as to correct variations in photoelectric transducer 13. A correction result is sent to luminance/color difference signal separator 85. Separator 85 performs various types of processing for the C, G, and Y color signals from correction circuit 84 to generate a luminance signal (I) and color difference signals (Cl and C2). The luminance and color difference signals are supplied to image quality improving circuit 86. Circuit 86 analyzes the luminance signal and the first and second color difference signals to perform image improving processing such as edge emphasis and character designation. An output from circuit 86 is supplied to chrominance signal converter 87. Converter 87 performs color conversion on the basis of the luminance and color difference signals after image quality improvement and generates one of yellow (Y), magenta (M), cyan (C), and black (B) (printing primaries (Y, M, and C) plus B) color signals. The selected color signal is supplied to binary circuit 88. Circuit 88 performs gray scale conversion, i.e., binarization of the color signal (i.e., one of the Y, M, C, and B color signals). The binary signal from circuit 88 is supplied to thermal head temperature controller 93.

Information such as a date or control number is input at operation panel 2, as described above. The input information is sent to number recording circuit 97. Recording circuit 97 converts the input information into a printing signal. The printing signal is sent to thermal head temperature controller 93.

Thermal head temperature controller 93 sends the printing signal to thermal head 31 on the basis of the binary signal from binary circuit 88 and the printing signal from number recording circuit 97. Head 31 performs printing (i.e., image formation) on sheet P in accordance with the printing signals. In this case, the input information can be output (printed) in a predetermined area (e.g., non-imaging area A shown in FIG. 12) of sheet P (in this case, e.g., a plastic film).

Chrominance signal converter 87 will be described in more detail with reference to FIG. 10. The luminance signal (I), the color difference signal (Cl) and the color difference signal (C2), all of which are sent from image quality improving circuit 86, are input to chrominance signal converter 87. One of the Y, M, C, and B signals is selected and sent to binary circuit 88. Selection for the Y, M, C, and B color signals is controlled by main controller 81. More specifically, controller 81 supplies selection signals a and b to chrominance signal converter 87. One of the Y, M, C, and B color signals to be sent to binary circuit 88 is selected according to a combination of selection signals a and b, as summarized in the following table.

| a | b | |
|---|---|---|
| 0 | 0 | Y |
| 0 | 1 | M |
| 1 | 0 | C |
| 1 | 1 | B |

In this case, color signals are automatically selected in a given order (e.g., an order of Y, M, C, and B) in the full-color copying mode or upon depression of continuous printing key 72 in the single-color mode. However, when key 72 is not depressed in the single-color mode, the color signal corresponding to one of color selection keys 62 is selected. The operation of the apparatus will be described with reference to the flow charts in FIGS. 11A-1, 11A-2 and 11B. In step S1, main controller 81 determines whether a single-color mode is set. If NO in step S1, the mode is determined as a normal color copying mode. In this case, the flow advances to step S2. Controller 81 determines in step S2 whether copying key 65 is depressed. If NO in step S2, the flow returns to step S1. However, if YES in step S2, the flow advances to step S3. In step S3, image formation is performed. In this case, since the color copying mode is set, color copying (image formation) is performed using thermal transfer ink ribbon 34 of different colors.

If YES in step S1, i.e., if the single-color mode is determined to be set, the graphic arts film mode is set. In this case, the flow advances to step S4. In step S4, the continuous printing flag is reset, and the flow advances to step S5. In step S5, controller 81 sends a conversion instruction for the yellow (Y) color signal to chrominance signal converter 87. The flow then advances to step S6. Controller 81 determines in step S6 whether continuous printing key 72 is depressed. If NO in step S6, the flow advances to step S7. However, if YES in step S6, the flow advances to step S8. In step S8, the continuous printing flag is set. The flow then advances to step S7. Controller 81 determines in step S7 whether one of color selection keys 62 is depressed. If NO in step S7, the flow advances to step S9. Controller 81 determines in step S9 whether the single-color mode is cleared. If YES in step S9, the flow returns to step S1. However, if NO in step S9, the flow advances to step S10. Controller 81 determines in step S10 whether copying key 65 is depressed. If NO in step S10, the flow returns to step S6.

If YES in step S7, i.e., one of color selection keys 62 is determined to be depressed, the flow advances to step S11. In step S11, the continuous printing flag is reset. The flow then advances to step S12. Controller 81 determines in step S12 whether Y key 68 is depressed. If YES in step S12, the flow advances to step S13. In step S13, controller 81 sends a conversion instruction for the yellow (Y) color signal to chrominance signal converter 87. The flow then returns to step S6. If NO in step S12, the flow advances to step S14. Controller 81 determines in step S14 whether M key 69 is depressed. If YES in step S14, the flow advances to step S15. In step S15, controller 81 sends a conversion instruction for the magenta (M) color signal to chrominance signal converter 87. The flow then returns to step S6. However, if NO in step S14, the flow advances to step S16. Controller 81 determines in step S16 whether C key 70 is depressed. If YES in step S16, the flow advances to step S17. In step S17, controller 81 sends a conversion instruction for the cyan (C) color signal to chrominance signal converter 87. The flow returns to step S6. If NO in step S16, the flow advances to step S18. Controller 81 sends a conversion instruction for the black (B) color signal to chrominance signal converter 87 in step S18 and the flow returns to step S6.

If YES in step S10, i.e., if copying key 65 is determined to be depressed, the flow advances to step S19. Controller 81 determines in step S19 whether the continuous printing flag is set. If NO in step S19, the flow advances to step S20. In step S20, an image with a designated color is formed on one sheet. In this case, i.e., in the graphic arts film mode, single-color copying (i.e., image formation) using the black thermal transfer ink ribbon is performed, as previously mentioned. Formation of the original image is performed with a designated color. At the same time, formation of control information such as a predetermined date or control number is performed. For example, if yellow (Y) is set, an image corresponding to the yellow (Y) component of the original image is formed. If magenta (M) is set, an image corresponding to the magenta (M) component of the original image is formed. It should be noted that the black thermal transfer ink ribbon has been set and plastic films as sheets P have been set in advance. As shown in FIG. 12, information such as the date (e.g., 11-6-86) and the control number (Y3115) is printed in non-imaging area A of sheet P, and at the same time, the image corresponding to the designated color component of the original image is formed in the imaging area of sheet P, thus obtaining the desired graphic arts film.

If continuous printing key 72 is not turned on, the graphic arts film corresponding to the color component designated by one of color selection keys 62 is obtained.

If the continuous printing flag is set in step S19, the flow advances to step S21. In step S21, controller 1 sends a conversion instruction for the yellow (Y) color signal to chrominance signal converter 87. The flow then advances to step S22. The first image (i.e., the image of the yellow component) is formed in accordance with the corresponding image formation signal. In this case, since the conversion instruction for the yellow (Y) color signal is sent to chrominance signal converter 87, the image corresponding to the yellow component of the original image is thus formed. At the same time, information (e.g., a date and a control number) which has been entered in advance is also printed. As shown in FIG. 13, information such as the date (11-6-86) and the control number (Y3115) is printed in the non-imaging area of first sheet P1, and at the same time, the image corresponding to the yellow component of the original image is formed in the imaging area to provide a graphic arts film for the yellow component.

When image formation of the first sheet P1 has been completed in step S22, the flow advances to step S23. In step S23, controller 81 sends a conversion instruction for the magenta (M) color signal to chrominance signal converter 87. The flow advances to step S24. In step S24, second image formation is performed in accordance with the image formation signal of the designated color. In this case, since the conversion instruction for the magenta (M) color signal is sent to chrominance signal converter 87, an image corresponding to the magenta component of the original image is formed. At the same time, information (e.g., a date and/or a control number) entered in advance can be formed on the sheet. For example, as shown in FIG. 13, information such as the date (11-6-86) and the control number (M3115) is formed in the non-imaging area of second sheet P2, and an image corresponding to the magenta component is formed in the imaging area, thereby obtaining a graphic arts film for the magenta component.

When second image formation has been completed in step S24, the flow advances to step S25. In step S25, the conversion instruction for the cyan (C) color signal is sent to chrominance signal converter 87. The flow advances to step S26. In step S26, third image formation is performed in accordance with the image formation signal of the designated color. Since controller 81 sends the conversion instruction for the cyan (C) color signal to chrominance signal converter 87, an image corresponding to the cyan component of the original image is formed. At the same time, information (e.g., a date or a control number) which has been entered in advance is printed on the corresponding sheet. More specifically, information such as the date (11-6-86) and the control number (C-3115) is formed in the non-imaging area of third sheet P3 and an image corresponding to the cyan component is formed in the imaging area, thereby obtaining a graphic arts film for the cyan component.

When third image formation has been completed in step S26, the flow advances to step S27. In step S27, controller 81 sends a conversion instruction for the black (B) color signal to chrominance signal converter 87. The flow advances to step S28. In step S28, fourth image formation is performed according to the image formation signal of the corresponding color component. In this case, controller 81 sends a conversion instruction for the black (B) color signal to chrominance signal converter 87. An image corresponding to the black component of the original image is formed. At the same time, information (e.g., a date or a control number) which has been entered in advance is formed. More specifically, information such as the date (11-6-86) and the control number (B3115) is formed in the non-imaging area of fourth sheet P4 and an image corresponding to the black component is formed in the imaging area, thereby preparing a graphic arts film for the black component.

When continuous printing key 72 is depressed, graphic arts films for the respective color components are continuously produced.

As is apparent from the above description, the original is optically scanned to obtain cyan, green, and yellow color signals. These signals are converted into yellow, magenta, cyan, and black image formation signals. Meanwhile, information (e.g., a date or a control number) which is not written on the original is entered in advance. One of the image formation signals and the input control information are used to form an image on a plastic film with the black thermal transfer ink ribbon. Unlike in the conventional system, wherein complex operations such as exposure and development are performed, these complex operations can be eliminated, and graphic arts films can be simply and easily produced by a compact, inexpensive system. In addition, information (e.g, a date or a control number) which is not written on the original can be entered in advance and can be formed on the sheet together with the original image. Since information (e.g., a date or a control number) which is not written on the original can be entered in advance and can be formed on the sheet together with the original image, graphic arts films can be easily prepared. In particular, similar graphic arts films can be clearly distinguished from each other. Moreover, by using the continuous printing key, four image forming signals are input to sequentially form images of the corresponding color components on four plastic films by using the black thermal transfer ink ribbon. Therefore, the graphic arts films of the respective color components can be continuously formed, thus shortening the operation time as compared with the case wherein each graphic arts film is formed by a plurality of operation steps.

The present invention is not limited to the particular embodiment described above. Various changes and modifications may be made within the spirit and scope of the invention.

For example, control information to be added to the original image may be a manufacturer's name. An input means for entering the manufacturer's name may be arranged in the operation panel. Alternatively, a separate input keyboard may be connected to the image formation apparatus. Furthermore, various pieces of information to be added may be stored in the main controller to automatically add desired information at the time of graphic arts film formation.

According to the present invention as described above, there is provided an image forming apparatus wherein graphic arts films can be easily prepared by a compact, inexpensive arrangement without using a complicated fabrication process, and at the same time, control information which is not written on the original can be formed on the graphic arts films.

What is claimed is:

1. An apparatus for forming color graphic arts films for an original plate, said apparatus comprising:
    means for outputting image forming signals of different colors corresponding to an original image;
    means for designating a plurality of pieces of color information corresponding to the image forming signals outputted by said outputting means;
    means for feeding a color transfer member having a color agent corresponding to at least one of the pieces of color information designated by said designating means;
    means for supplying a predetermined number of plastic films;
    means for inputting control information so as to control by identification color graphic arts films, said control information including at least color information of each of the colors corresponding to said plurality of pieces of color information designated by said designating means; and
    means for forming the color graphic art films, each having the original image which is formed on the basis of one of the image forming signals of different colors outputted by said outputting means and a control image which is formed on the basis of the control information inputted by said inputting means, by transferring the color agent of said color transfer member fed by said feeding means onto the plastic films supplied by said supplying means in accordance with the designation of said designating means, the control image being formed at a predetermined position on each of the plastic films at the same time as the original image is formed on each of the plastic films.

2. An apparatus according to claim 1, wherein said outputting means comprises means for optically scanning an original and reading the original image as color signals of different colors, and means for converting the color signals of different colors read by said reading means into the image forming signals of different colors.

3. An apparatus according to claim 2, wherein said designating means comprises means for simultaneously designating said plurality of pieces of color information.

4. An apparatus according to claim 3, wherein said inputting means comprises means for simultaneously designating said color graphic arts films.

5. An apparatus according to claim 2, wherein said color signals of different colors comprise cyan, magenta and yellow color signals, or red, green and blue color signals.

6. An apparatus according to claim 5, wherein said image forming signals of different colors comprise yellow, magenta, cyan and black image forming signals, or yellow, magenta and cyan image forming signals.

7. An apparatus according to claim 1, wherein said designating means comprises means for individually designating said plurality of pieces of color information.

8. An apparatus according to claim 7, wherein said inputting means comprises means for individually designating said color graphic arts films.

9. An apparatus according to claim 1, wherein said color transfer member fed by said feeding means is a thermal transfer ink ribbon.

10. An apparatus according to claim 1, wherein the color transfer member fed by said feeding means includes at least a black color agent.

* * * * *